3,264,226
PLASMA ARC SPRAYED CATALYSTS

Marvin M. Johnson, Bartlesville, Okla., assignor to Phillips Petroleum Company, a corporation of Delaware
No Drawing. Filed June 7, 1962, Ser. No. 200,655
5 Claims. (Cl. 252—465)

This invention relates to improved catalysts, to a method of manufacturing the improved catalysts, and to contacting processes utilizing the improved catalysts.

The efficiency of a catalyst in any given process depends upon certain known characteristics as well as characteristics which are not known to the workers in the art. There is a continual struggle going on in the chemical field to develop more active, more efficient, and more durable catalysts, yet a great deal of the work in this field is based upon empirical experimentation because of the lack of complete theoretical knowledge as to the characteristics of materials which affect the activity, efficiency, and durability of a catalyst. The strong incentive to discover or devise an improved catalyst is based principally upon the fact that an improved catalyst which effects an improved yield of only one or two percent over known catalyst may result in a saving of hundreds of thousands of dollars in a given process. The economic importance of better catalysts, e.g., can well be illustrated by reference to a plant process for the production of butadiene from n-butane in which an alumina-chromia catalyst is utilized to dehydrogenate the n-butane to butenes and butadiene in a butadiene plant which is producing approximately 6,000 tons of butadiene per month. An improvement in the catalyst which effects an improved yield of only a few percent, say 5 percent, effects additional production of 300 tons per month which is an economic improvement well worth considerable effort in devising improved catalysts.

In accordance with the invention it has been discovered that novel supported catalysts having improved features can be prepared by depositing a film of the catalytic material on the support material through the utilization of a plasma jet. For example, chromia can be introduced into the plasma stream at a point immediately adjacent to the arc and sprayed onto an alumina support by means of the plasma stream. A plasma stream can be defined as consisting of neutral gas, ions and electrons at high temperatures, and can be produced by passing a suitable gas, such as argon or helium, through an arc produced by a high density current between two suitable electrodes. Such a plasma arc torch is capable of attaining temperatures in the range of 5,000 to 30,000° F., and in this temperature range any metal or metal oxide which is introduced into the plasma jet becomes either molten or vaporized. The molten or vaporized metal or metal oxide can be directed against an object upon which the metal or metal oxide will deposit and become bonded thereto by mechanical and/or metallurgical bonding. A suitable device for producing the plasma jet and introducing the metal or metal oxide into the plasma jet is set forth in Giannini, U.S. Patent No. 2,922,869, issued January 26, 1960, the description of which is incorporated herein by reference. That a plasma arc sprayed catalyst is even effective, besides being more efficient, is surprising as the use of such high temperatures would lead one skilled in the art to expect a reduction in catalytic activity.

Accordingly it is an object of this invention to provide novel and improved catalysts. Another object of the invention is to provide a method for producing novel and improved catalysts. A still further object of the invention is to provide improved contacting processes. Yet another object of the invention is to provide more efficient contacting processes, such as the conversion of hydrocarbons in contact with catalysts in accordance with the invention.

Other objects, aspects and advantages of the invention will be apparent from a study of the disclosure and the appended claims to the invention.

Materials which are suitable for utilization as the catalytic material of a catalyst in accordance with the invention include chromium, molybdenum, tungsten, vanadium, iron, cobalt, nickel, palladium, platinum, copper, manganese, silver, types 4F and 5F rare earths such as for example cerium and thorium, and/or the oxides of one or more of the preceding elements, and/or mixtures of any two or more of the preceding elements and/or their oxides. Materials which are suitable for utilization as the support material of a catalyst in accordance with the invention include alumina, silica, steel, iron, asbestos, pumice, bentonite, thoria, titania, boria, natural earth, and other conventional catalyst support materials, and mixtures thereof.

The catalyst support materials to be coated can be in any desired shape, but are preferably of a size which is readily recoverable from the coating operation. Thus, catalyst support materials in the form of pellets, spheres, and/or saddles can be exposed to the plasma stream containing the molten and/or vaporized catalytic material supported element while being rotated in a cage of metal or other suitable material in order to obtain uniform coating. The support material to be coated can be maintained in an inert atmosphere, such as a flowing stream of carbon dioxide, to cool the support material and prevent undesirable side reactions.

The spraying of the catalytic material upon the support material of the catalyst can be carried out under a wide range of temperature and flow rate conditions. The spraying is satisfactory under any operating conditions of the plasma generating apparatus which produce a sustaining arc and which result in the charge of catalytic material becoming molten or vaporized upon introduction thereof into the plasma stream followed by the catalytic material which has been sprayed onto the support material becoming bonded to the support on subsequent cooling.

The resulting catalyst body can vary over a wide range in composition. In general, the catalytic material will constitute in the range of about .05 to about 45 weight percent, preferably in the range of about .1 to about 35 weight percent, and more preferably in the range of about 5 to about 25 weight percent of the total catalyst body.

The plasma stream is desirably produced from inert gases, such as argon and helium, to prevent oxidation of the catalyst support material and rapid deterioration of the electrodes of the plasma stream generating apparatus. Auxiliary streams of inert gas can be utilized as a carrier to feed the catalytic material, preferably in powder form, into the plasma stream. Small amounts of other materials, such as hydrogen, can be blended with the principal plasma producing gas to modify the catalyst being produced. If desired, the catalytic material can be fed into the arc region as an aqueous solution or suspension.

A particular advantage of the present invention is in the preparation of catalysts involving the utilization of expensive materials, such as platinum, for the catalytic material, whereby a uniform deposition of the expensive material on the outside only of the support material can be effected with startling economy in comparison with the methods of the prior art.

Depending upon the choice of components, the plasma arc sprayed catalysts can be utilized in a variety of catalytic hydrocarbon contacting processes such as aromatization, cyclization, hydrogenation, dehydrogenation, isomerization, alkylation, and polymerization.

The following examples are presented in further illustration of the invention but are not to be construed in undue limitation of the invention.

EXAMPLE I

Preparation of chromia catalyst

A plasma arc torch (Plasmadyne Model SG–1, water cooled, 5/16 inch orifice, copper and tungsten electrodes) was fitted for argon flow of about 0.8 c.f.m. and its action was initiated by a radio frequency discharge which initially ionized a portion of the gas. The torch was then self sustaining. While operating at 30 v. and 550 amps., powdered (−300/+325 mesh) $Cr_2O_3$ was delivered to the arc region with a smaller auxiliary flow of argon as a carrier. The plasma stream, which had a temperature in the range of 10,000–15,000° F., was directed at 1/8 inch alumina pellets (Harshaw 1404T) being tumbled in an open cup in a blanket of $CO_2$ for a period of 2 minutes. During the coating run the pellets changed in color from grey to black. The preparation was repeated in another 2 minute run with the plasma torch operating at 27 v. and 600 amps. with substantially the same results.

In another 2 minute run, the chromium oxide powder was deposited on shot-sized iron pellets at 27 v. and 600 amps in a fashion similar to the above. A chromium oxide coated iron catalyst resulted.

EXAMPLE II

Preparation of chromia catalyst with mixed gases

A chromium oxide catalyst supported on alumina pellets was prepared in a manner essentially identical to Example I except that the arc gas comprised 96.3 volume percent argon and 3.7 volume percent hydrogen. At 34 v., 500 amps, with 0.8 c.f.m. arc gas and about 0.4 c.f.m. powder carrier gas, 86.2 g. of pellets were coated with 8.1 percent chromium oxide (based on gain in weight).

In a similar fashion alumina pellets containing 8.3 percent chromium oxide were prepared at 440–460 amps, 36–7 v., 0.8 c.f.m. arc gas, and about 0.4 c.f.m. powder carrier gas where the arc gas comprised 95 volume percent argon and 5 volume percent hydrogen.

EXAMPLE III

Preparation of molybdenum catalyst

Using the equipment and general procedure of Example I a catalyst comprising molybdenum metal on steel balls was produced at 27 v., 400 amps., 0.8 c.f.m. arc gas, and about 0.4 c.f.m. powder carrying gas by passing powdered molybdenum metal through the plasma stream and directing it at steel balls being tumbled in a metal cage in an atmosphere of $CO_2$ in a total run time of about 2.5 minutes. The balls increased in diameter from 0.173 inch to about 0.178 inch and contained 10 weight percent molybdenum after being coated.

EXAMPLE IV

Dehydrogenation of cyclohexane

The molybdenum catalyst prepared in Example III was evaluated in a dehydrogenation run in which cyclohexane was converted to benzene. A 225.6 g. quantity of the molybdenum coated steel balls were charged into the center section of a reaction tube which was contained in a furnace while in a vertical position. The reactor tube was equipped for continuous operation in which cyclohexane was pumped into the top of the tube together with a stream of hydrogen and the bottom of the tube discharged past a pressure reducing valve into a liquids condenser and a gas wet test meter.

Two one hour dehydrogenation runs were carried out at different temperatures. The essential data and results of these runs are shown in the following Table I:

TABLE I

|  | Run 1 | Run 2 |
|---|---|---|
| Reaction Temp., °F | 852 | 901 |
| Reaction Pressure, p.s.i.g | 200 | 200 |
| Liquid-Hourly-Space-Velocity | 1.0 | 1.0 |
| Hydrogen/Hydrocarbon, mol ratio | 3.0 | 3.0 |
| Products, Wt. percent: |  |  |
| $C_5$ and lighter | 8.3 | 14.9 |
| Benzene | 44.2 | 55.7 |
| Methylcyclopentane | } 46.7 | 27.0 |
| Cyclohexane |  |  |
| Normal+Isohexanes |  |  |
| Toluene | 0.8 | 2.4 |
| Coke |  |  |
| Total | 100.0 | 100.0 |

As is seen from the table, the catalyst was found very effective in the dehydrogenation converting cyclohexane into benzene.

EXAMPLE V

Hydrocracking

A chromia-alumina catalyst prepared by means of an argon plasma in a manner similar to that set forth in Example I was used in a hydrocracking process where the material subjected to the hydrocracking was a mixture of high boiling polyphenyls which boiled above terphenyl and which had a molecular weight distribution from about 200 to about 1400 with an average molecular weight of about 540. A similar chromia-alumina catalyst prepared with a hydrogen-argon plasma as in Example II was also found effective in the same process. These catalysts contained about 8 weight percent chromia and were crushed to a −10/+18 mesh size before use. For comparison purposes a conventional chromia-alumina catalyst, containing about 20 weight percent chromia and prepared by standard impregnation, drying, and calcination, was also tested under essentially identical conditions.

The cracking reaction conditions included: 2 hours reaction time; 900° F. reaction temperature; 1000 p.s.i.g. total pressure; hydrogen flow rate equivalent to 20 moles per mole high boiler feed; and high boiler feed diluted to 40 weight percent high boiler in xylene. The results of these runs are seen in the following Table II:

TABLE II

|  | Argon Plasma Sprayed Catalyst | Hydrogen-Argon Plasma Sprayed Catalyst | Conventional Catalyst |
|---|---|---|---|
| Feed rate, LHSV [1] | 0.9 | 1.0 | 1.0 |
| Conversion, percent | 94 | 92 | 67 |
| Yields, wt. percent: |  |  |  |
| Lighter than biphenyl | 57.9 | 58.4 | 37.1 |
| Alkylbiphenyls, alkylterphenyls | 5.0 | } 25.3 | { 5.0 |
| Biphenyl, terphenyls, triphenylene | 22.8 |  | { 21.2 |
| Unconverted high boiler | 5.0 | 7.3 | 29.7 |
| Coke | 9.3 | 9.0 | 7.0 |

[1] Liquid-hourly-space-velocity, based on total liquid charge.

Thus, the conventional chromia-alumina catalyst produced only 67 percent conversion whereas the argon plasma arc sprayed chromia-alumina catalyst produced 94 percent conversion and the hydrogen-argon plasma sprayed chromia-alumina catalyst produced 92 percent conversion. Moreover, this higher conversion was accomplished with less chromia in the plasma arc sprayed catalysts (8%) than in the conventional catalyst (20%). The theory or physical characteristics by which the plasma arc sprayed catalyst gives better results than the corresponding conventional catalyst is not completely understood. It is possible that the increased activity may be due to some reduction of the catalytic material due to the extreme heat treating. The presence of some reduced oxides in the crystal lattice may form defect structures which may enhance the catalytic activity.

The plasma arc sprayed catalysts can be regenerated by conventional means such as by air at elevated temperatures.

Reasonable variation and modification are possible within the scope of the disclosure and the appended claims to the invention.

I claim:
1. A process for manufacturing a supported active catalyst which comprises producing a plasma jet having a temperature within the range of about 5000 to about 30,000° F., introducing a catalytic material selected from the group consisting of chromium, molybdenum, tungsten, vanadium, iron, cobalt, nickel, copper, manganese, silver, types 4F and 5F rare earths, the oxides of each of the mentioned elements, and mixtures thereof into said plasma jet, directing the plasma jet containing said catalytic material against a support material selected from the group consisting of alumina, silica, steel, iron, asbestos, pumice, bentonite, boria, thoria, titania, natural earth and mixtures thereof to deposit said catalytic material on said support material.

2. The supported active catalyst produced by the process of claim 1.

3. The process of claim 1 wherein said catalytic material is chromia.

4. The process of claim 1 wherein said catalytic material is molybdenum.

5. The process of claim 1 wherein said support material is alumina and said catalytic material is chromia.

References Cited by the Examiner

UNITED STATES PATENTS

| | | | |
|---|---|---|---|
| 2,499,255 | 2/1950 | Parker | 208—136 |
| 2,533,071 | 12/1950 | Vesterdal et al. | 260—449.6 |
| 2,703,308 | 3/1955 | Oblad et al. | 208—110 |
| 2,922,869 | 1/1960 | Gianni | 219—75 |
| 3,030,300 | 4/1962 | Flanders et al. | 208—119 |
| 3,044,954 | 7/1962 | Hirschler | 208—120 |
| 3,125,539 | 3/1964 | Teagne | 252—460 |

References Cited by the Applicant

Advances in Catalysts and Related Subjects, Academic Press, Inc., publishers, New York, New York, 1952, pages 99–103, volume IV.

DELBERT E. GANTZ, *Primary Examiner.*

ALPHONSO D. SULLIVAN, *Examiner*

A. RIMENS, *Assistant Examiner.*